(12) United States Patent
Hashimoto

(10) Patent No.: US 11,757,208 B2
(45) Date of Patent: Sep. 12, 2023

(54) WIRING HARNESS AND PROTECTOR

(71) Applicant: SUMITOMO WIRING SYSTEMS, LTD., Mie (JP)

(72) Inventor: Kohei Hashimoto, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/592,726

(22) Filed: Feb. 4, 2022

(65) Prior Publication Data

US 2023/0068257 A1    Mar. 2, 2023

(30) Foreign Application Priority Data

Aug. 24, 2021    (JP) ................................. 2021-136440

(51) Int. Cl.
*H01R 4/30* (2006.01)
*H02G 15/113* (2006.01)
*H01R 4/70* (2006.01)

(52) U.S. Cl.
CPC ............... *H01R 4/308* (2013.01); *H01R 4/70* (2013.01); *H02G 15/113* (2013.01)

(58) Field of Classification Search
CPC ......... H01R 4/308; H01R 4/70; H02G 15/113
See application file for complete search history.

(56) References Cited

FOREIGN PATENT DOCUMENTS

| EP | 0723315 A2 | * | 7/1996 |
| JP | 2006324069 A | * | 11/2006 |
| JP | 2016-019434 A | | 2/2016 |

* cited by examiner

*Primary Examiner* — Jean F Duverne
(74) *Attorney, Agent, or Firm* — Venjuris, P.C.

(57) ABSTRACT

A wiring harness is provided with a first wire member including a first terminal and a first wire and a protector for accommodating the first wire member. The protector includes a protector body, a bolt and a restricting portion. The protector body has a bottom wall extending in a length direction, two side walls projecting from both side edges of the bottom wall and facing each other, and an opening formed by the two side walls and facing the bottom wall. The bolt projects from the protector body and is inserted into a through hole of the terminal. The restricting portion covers only a part of the first wire member closer to a side opposite to a tip side of the first terminal than the through hole in the length direction, and restricts a movement of the first wire member in a projecting direction of the bolt.

11 Claims, 10 Drawing Sheets

WIRING HARNESS AND PROTECTOR

CROSS-REFERENCE TO RELATED APPLICATIONS

This application is based on and claims priority from Japanese Patent Application No. 2021-136440, filed on Aug. 24, 2021, with the Japan Patent Office, the disclosure of which is incorporated herein in its entirety by reference.

TECHNICAL FIELD

The present disclosure relates to a wiring harness and a protector.

BACKGROUND

Conventionally, a wiring harness is known which includes a plurality of wire members to be electrically connected to each other and a protector for accommodating these wire members (see, for example, Japanese Patent Laid-open Publication No. 2016-019434). The wiring harness of Japanese Patent Laid-open Publication No. 2016-019434 includes a first wire member, a second wire member and a third wire member. The first wire member includes a L-shaped first terminal. The second and third wire members respectively include a second terminal and a third terminal.

The protector has a bottom wall extending in a length direction of the first wire member, two side walls projecting from both side edges of the bottom wall and facing each other, and an opening facing the bottom wall. The opening is formed by the two side walls.

Two bolts having head portions embedded in the bottom wall are provided inside the protector. The tips of the two bolts are facing toward a side opposite to the bottom wall. A cover for covering the opening is removably provided on the protector.

The first terminal includes two through holes into which the two bolts are inserted. The second terminal includes a through hole into which one of the bolts is inserted. The third terminal includes a through hole into which the other bolt is inserted. The one bolt is inserted into one of the through holes of the first terminal and the through hole of the second terminal. The other bolt is inserted into the other of the through holes of the first terminal and the through hole of the third terminal. A nut is attached to each bolt. By these, both the second and third terminals are electrically connected to the first terminal.

SUMMARY

In assembling such a wiring harness, with the terminal of one wire member accommodated inside the protector and the bolts inserted in the through holes of the terminal, the terminals of the other wire members are accommodated into the protector and the bolts are inserted into the through holes of these terminals. By attaching the nuts to the bolts, the wire members are electrically connected. At this time, the terminal may come out from the bolt in a temporarily assembled state where only one wire member is accommodated inside the protector. Such a problem not only arises during the assembling of the wiring harness, but also similarly arises also in the case of transporting the wiring harness in the temporarily assembled state.

The present disclosure aims to provide a wiring harness and a protector capable of suppressing the escape of a terminal from a bolt.

The present disclosure is directed to a wiring harness with a wire member including a terminal having a through hole and a wire connected to the terminal, and a protector for accommodating the wire member, wherein the protector includes a protector body having a bottom wall extending in a length direction of the wire member, two side walls projecting from both side edges of the bottom wall and facing each other and an opening formed by the two side walls and facing the bottom wall, a bolt having a tip facing a side opposite to the bottom wall, projecting from the bottom wall and to be inserted into the through hole of the terminal, and a restricting portion for covering only a part of the wire member closer to a side opposite to a tip side of the terminal than the through hole in the length direction, the restricting portion restricting a movement of the wire member in a projecting direction of the bolt.

The present disclosure is directed to a protector for accommodating a wire member including a terminal having a through hole and a wire connected to the terminal, the protector including a protector body having a bottom wall extending in a length direction of the wire member, two side walls projecting from both side edges of the bottom wall and facing each other and an opening formed by the two side walls and facing the bottom wall, a bolt having a tip facing a side opposite to the bottom wall, projecting from the bottom wall and to be inserted into the through hole of the terminal, and a restricting portion for covering only a part of the wire member closer to a side opposite to a tip side of the terminal than the through hole in the length direction, the restricting portion restricting a movement of the wire member in a projecting direction of the bolt.

According to the present disclosure, it is possible to suppress the escape of a terminal from a bolt.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
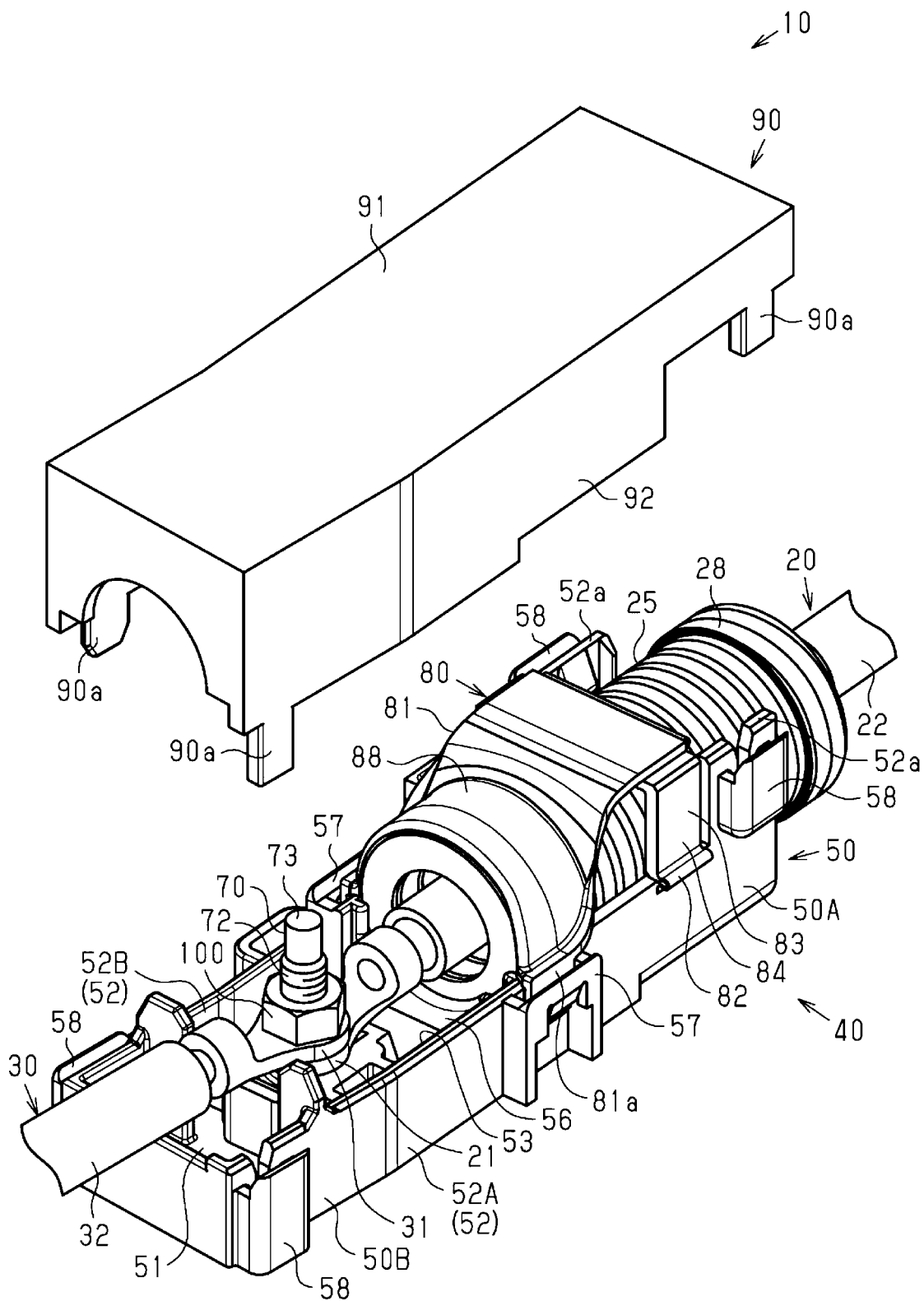
FIG. 1 is an exploded perspective view showing a wiring harness of one embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

DESCRIPTION OF EMBODIMENTS OF
PRESENT DISCLOSURE

First, embodiments of the present disclosure are listed and described.

[1] The wiring harness of the present disclosure is provided with a wire member including a terminal having a through hole and a wire connected to the terminal, and a protector for accommodating the wire member, wherein the protector includes a protector body having a bottom wall extending in a length direction of the wire member, two side walls projecting from both side edges of the bottom wall and facing each other and an opening formed by the two side walls and facing the bottom wall, a bolt having a tip facing a side opposite to the bottom wall, projecting from the bottom wall and to be inserted into the through hole of the terminal, and a restricting portion for covering only a part of the wire member closer to a side opposite to a tip side of the terminal than the through hole in the length direction, the restricting portion restricting a movement of the wire member in a projecting direction of the bolt.

According to this configuration, a movement of the wire member in the projecting direction is restricted inside the protector. Therefore, the escape of the terminal from the bolt can be suppressed.

[2] Preferably, the restricting portion restricts a movement of the wire member in the length direction by contacting the wire member.

According to this configuration, since a movement of the wire member in the length direction is restricted, it is possible to suppress the application of a load to the terminal according to this movement of the wire member.

[3] Preferably, the restricting portion includes a restricting portion body for opening and closing the opening, and a hinge coupling one of the two side walls and the restricting portion body.

According to this configuration, the opening of the protector body can be opened and closed by rotating the restricting portion body via the hinge. Therefore, the restricting portion can be embodied by a simple configuration.

[4] Preferably, the restricting portion body includes an engaging portion to be engaged with the other of the two side walls.

According to this configuration, a state where the opening of the protector body is closed by the restricting portion body is easily maintained by engaging the restricting portion body with the other of the two side walls. Therefore, a movement of the wire member in the projecting direction of the bolt can be effectively restricted.

[5] Preferably, when the hinge is a first hinge, the restricting portion body includes a first part coupled to the first hinge, the first part covering the wire member from a side opposite to the bottom wall, a second part to be overlapped on an outer surface of the first part, the second part covering a part of the wire member closer to the terminal than a part covered by the first part in the length direction, and a second hinge provided on one end edge of the first part on a side opposite to the terminal in the length direction, the second hinge coupling the first and second parts, and the second part is provided rotatably to a position where the second part is overlapped on the outer surface of the first part via the second hinge and a position where the second part is unfolded with respect to the first part and extends toward the side opposite to the terminal in the length direction.

For example, if a part projecting from the protector body or the like is present on an outer peripheral side of the side wall where the first hinge is provided, the restricting portion body may interfere with this part by rotating the restricting portion body toward the outer peripheral side of the side wall.

In this respect, according to the above configuration, the second part longer than the first part in the length direction is coupled to the first part via the second hinge and is overlapped on the outer surface of the first part. The second part is provided rotatably to the position where the second part is overlapped on the outer surface of the first part via the second hinge and the position where the second part is unfolded with respect to the first part. Thus, in rotating the restricting portion body toward the outer peripheral side of the side wall, the restricting portion body can be rotated toward the outer peripheral side of the side wall with the second part unfolded with respect to the first part. At this time, the second part extends from the first part toward the side opposite to the terminal in the length direction. That is, the second part extends in a direction away from the above part. Therefore, the aforementioned inconvenience is easily avoided.

[6] Preferably, the restricting portion and the protector body are integrally formed.

According to this configuration, an increase in the number of components of the protector and, consequently, the number of components of the wiring harness can be suppressed.

[7] Preferably, the wire member includes a corrugated tube for covering an outer periphery of the wire, and the restricting portion restricts a movement of the corrugated tube with respect to the protector body by contacting the corrugated tube.

According to this configuration, a movement of the wire member with respect to the protector body is restricted via the corrugated tube. Therefore, the escape of the terminal from the bolt can be suppressed.

[8] Preferably, the corrugated tube has a bellow structure in which annular projections and annular recesses having a smaller outer diameter than the projections are alternately provided in the length direction, and the restricting portion includes engaging projections to be engaged with the recesses.

According to this configuration, a movement of the protector body with respect to the corrugated tube can be effectively restricted by the engagement of the engaging projections of the restricting portion with the recesses of the corrugated tube.

[9] Preferably, the protector includes a cover removably provided on the protector body, the cover collectively covering the restricting portion and the terminal.

According to this configuration, since the restricting portion and the terminal are collectively covered by the cover, a connected part of the terminal can be protected and the removal of the restricting portion from the protector body can be suppressed.

[10] Preferably, when the terminal is a first terminal, the wire is a first wire and the wire member is a first wire member, the wiring harness comprises a second wire member including a second terminal having a through hole and a second wire connected to the second terminal, the second wire member being electrically connected to the first wire member, the bolt is inserted into the through hole of the first terminal and the through hole of the second terminal, and a nut for fastening the first and second terminals is attached to the bolt.

According to this configuration, the escape of the terminal from the bolt can be suppressed in a temporarily assembled state where the bolt is inserted in the through hole of the first terminal and the first and second terminals are not fastened by the bolt and the nut.

[11] The protector of the present disclosure is for accommodating a wire member including a terminal having a through hole and a wire connected to the terminal and includes a protector body having a bottom wall extending in a length direction of the wire member, two side walls projecting from both side edges of the bottom wall and facing each other and an opening formed by the two side walls and facing the bottom wall, a bolt having a tip facing a side opposite to the bottom wall, projecting from the bottom wall and to be inserted into the through hole of the terminal, and a restricting portion for covering only a part of the wire member closer to a side opposite to a tip side of the terminal than the through hole in the length direction, the restricting portion restricting a movement of the wire member in a projecting direction of the bolt.

According to this configuration, a movement of the wire member in the projecting direction is restricted inside the protector. Therefore, the escape of the terminal from the bolt can be suppressed.

Details of Embodiment of Present Disclosure

Specific examples of a wiring harness and a protector of the present disclosure are described below with reference to the drawings. In each figure, some of components may be shown in an exaggerated or simplified manner for the convenience of description. Further, a dimension ratio of each part may be different in each figure. Note that the present invention is not limited to these illustrations and is intended to be represented by claims and include all changes in the scope of claims and in the meaning and scope of equivalents. "Orthogonal" in this specification means not only strictly orthogonal, but also substantially orthogonal within a range in which functions and effects in the embodiment are achieved.

(Configuration of Wiring Harness 10)

A wiring harness 10 is, for example, for electrically connecting electrical devices installed in a vehicle such as a hybrid or electric vehicle.

Figure 2:
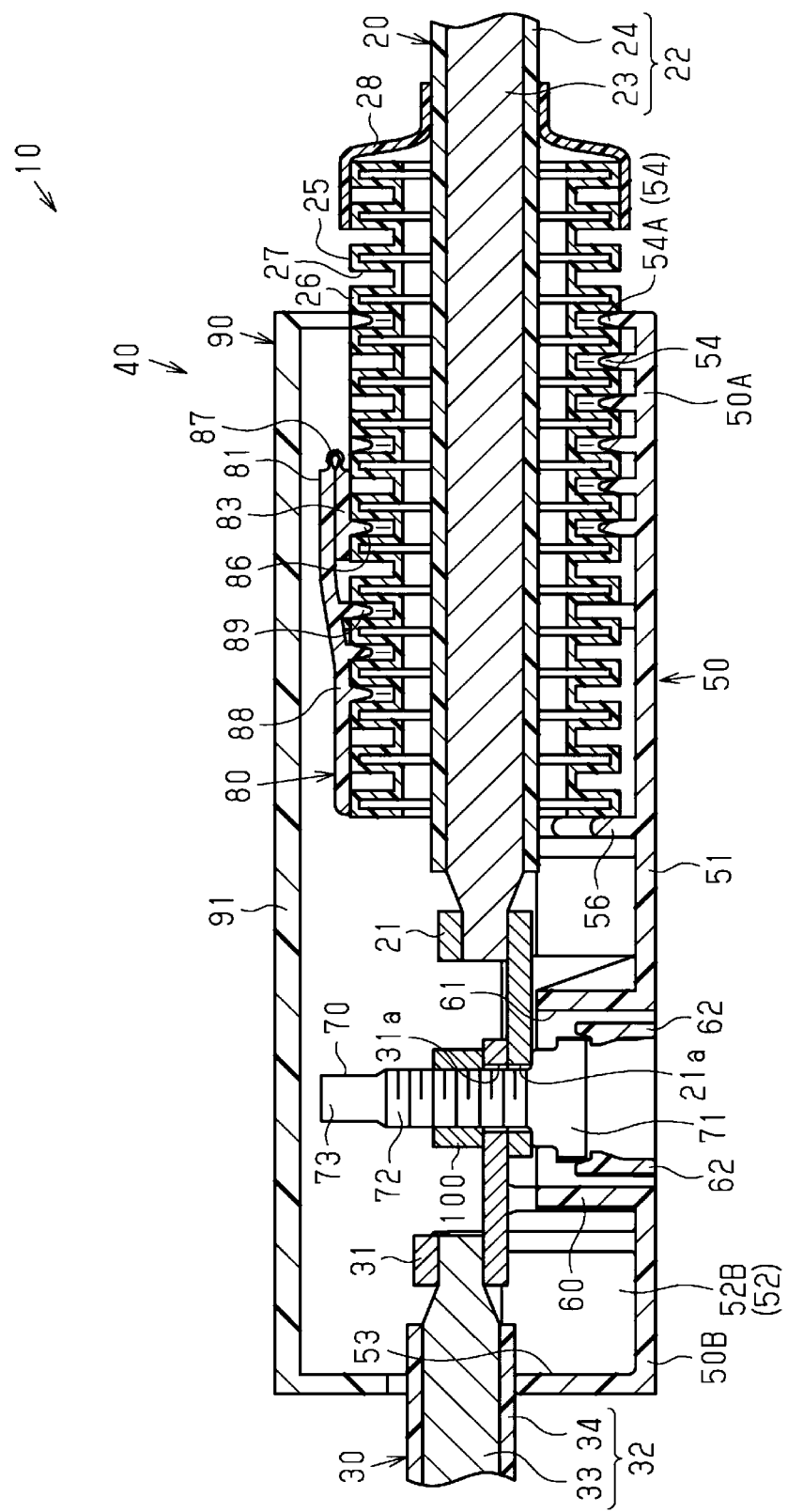
FIG. 2 is a section showing the wiring harness of the one embodiment.

As shown in FIGS. 1 and 2, the wiring harness 10 includes a first wire member 20, a second wire member 30 and a protector 40 for accommodating the first and second wire members 20, 30. The first and second wire members 20, 30 are electrically connected inside the protector 40. The first and second wire members 20, 30 are, for example, pulled out from the protector 40 in directions opposite to each other along a length direction of the first wire member 20.

The length direction of the first wire member 20 is merely referred to as a length direction below.

(Configuration of First Wire Member 20)

As shown in FIG. 2, the first wire member 20 includes a first terminal 21, a first wire 22 connected to the first terminal 21, and a corrugated tube 25 for covering the outer periphery of the first wire 22. The corrugated tube 25 is pulled out from the protector 40.

(Configuration of First Terminal 21)

The first terminal 21 includes a circular through hole 21a. A metal material such as copper, copper alloy, aluminum, aluminum alloy or stainless steel can be, for example, used as a material of the first terminal 21.

(Configuration of First Wire 22)

The first wire 22 includes a core 23 composed of a conductor and an insulation coating 24 covering the outer periphery of the core 23. A copper-based or aluminum-based metal material can be, for example, used as a material of the core 23. A synthetic resin mainly containing a polyolefin-based resin such as a cross-linked polyethylene and a cross-linked polypropylene can be, for example, used as a material of the insulation coating 24.

The core 23 is exposed from the insulation coating 24 in an end part of the first wire 22. The core 23 exposed from the insulation coating 24 is electrically connected to the first terminal 21.

(Configuration of Corrugated Tube 25)

The corrugated tube 25 has a bellows structure in which annular projections 26 and annular recesses 27 having a smaller outer diameter than the projections 26 are alternately provided in the length direction. The corrugated tube 25 is flexible.

A conductive resin material or non-conductive resin material can be, for example, used as a material of the corrugated tube 25. A synthetic resin such as polyolefin, polyamide, polyester or ABS resin can be, for example, used as the resin material.

An end part of the corrugated tube 25 and the first wire 22 pulled out from the protector 40 are, for example, fixed by a fixing member 28 such as a tape. The fixing member 28 is wound on the end part of the corrugated tube 25 and the first wire 22 over the entire periphery. In this way, relative movements of the corrugated tube 25 and the first wire 22 are restricted.

(Configuration of Second Wire Member 30)

The second wire member 30 includes a second terminal 31 and a second wire 32 connected to the second terminal 31.

The second terminal 31 and the second wire 32 respectively have the same configurations as the first terminal 21 and the first wire 22. Thus, the components of the second wire member 30 are denoted by reference signs "3*" obtained by adding "10" to the reference signs "2*" denoting the components of the first wire member 20, whereby repeated description is omitted.

(Configuration of Protector 40)

As shown in FIG. 1, the protector 40 includes a protector body 50, a bolt 70 projecting from the protector body 50, a restricting portion 80 integrally provided to the protector body 50 and a cover 90 removably provided on the protector body 50.

(Configuration of Protector Body 50)

Figure 3:
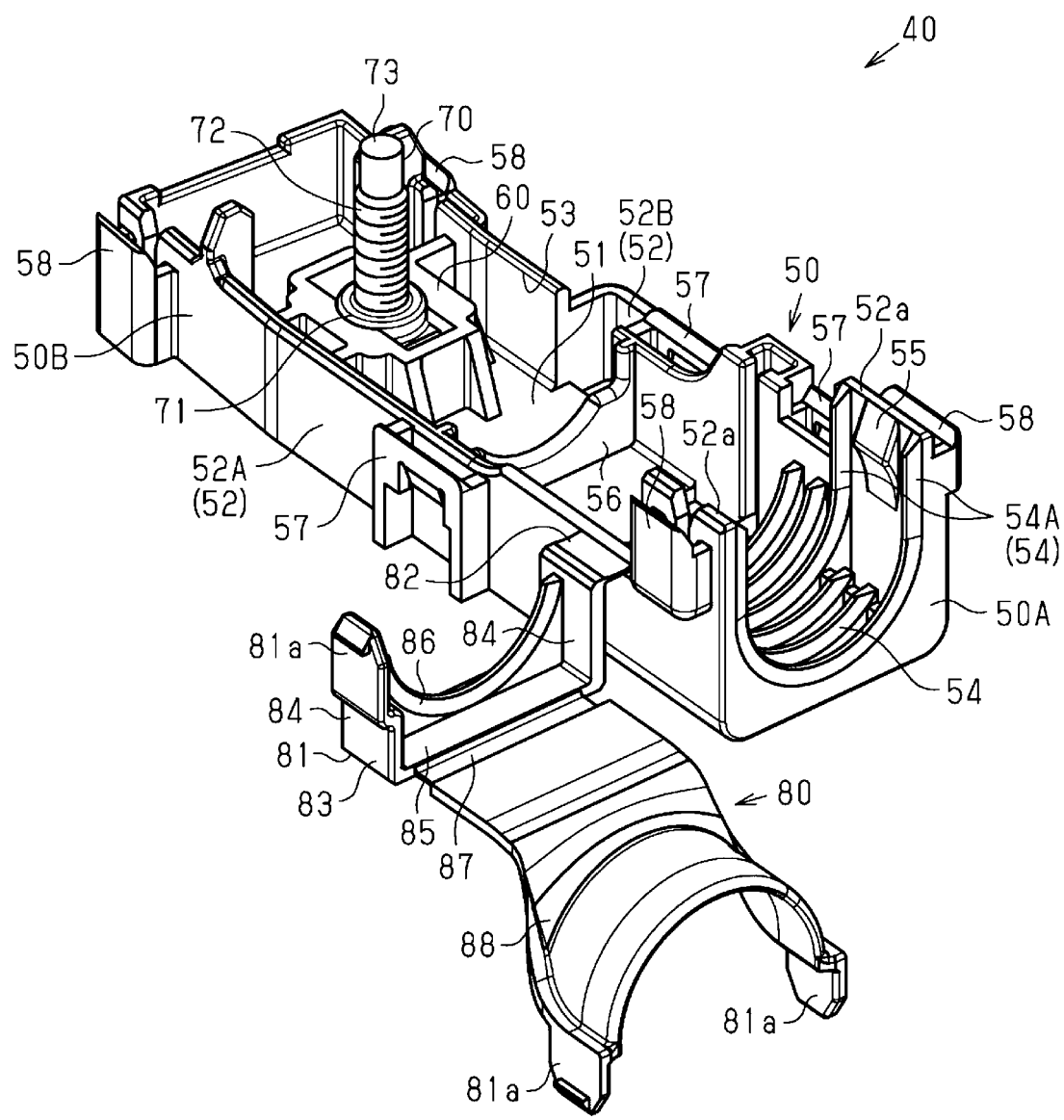
FIG. 3 is a perspective view showing a protector of the one embodiment.
Figure 4:
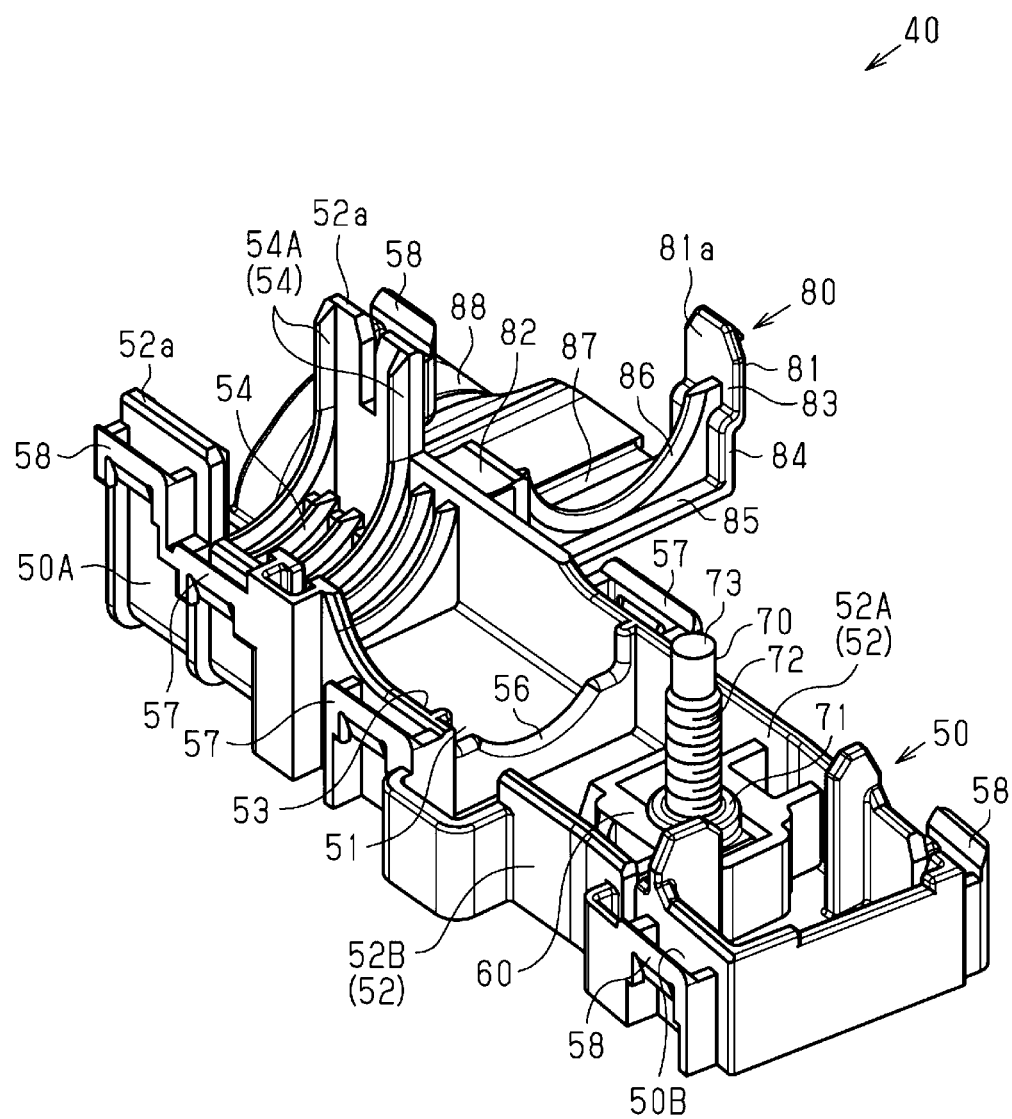
FIG. 4 is a perspective view showing the protector of the one embodiment.

As shown in FIGS. 3 and 4, the protector body 50 has a bottom wall 51 extending in the length direction, two side walls 52 projecting from both side edges of the bottom wall 51 and facing each other, and an opening 53 facing the bottom wall 51. The opening 53 is formed by the two side walls 52. An insulating material such as a synthetic resin can be, for example, used as a material of the protector body 50.

In the following description, the two side walls 52 may be distinguished by setting one of the two side walls 52 as the side wall 52A and the other as the side wall 52B.

The protector body 50 includes a first end 50A located on one side in the length direction and a second end 50B located on the other side in the length direction. The first wire member 20 is pulled out from the first end 50A. The second wire member 30 is pulled out from the second end 50B.

Parts of the two side walls 52 constituting the first end 50A have projecting ends 52a projecting more than other parts in the side walls 52.

A plurality of engaging projections 54 to be engaged with the recesses 27 of the corrugated tube 25 are provided on the inner surface of the first end 50A. The plurality of engaging projections 54 are provided at intervals from each other in the length direction. Each of the engaging projections 54 has, for example, an arcuate shape along the outer peripheral surface of the recess 27.

The plurality of engaging projections 54 include engaging projections 54A extending from the bottom wall 51 to the projecting ends 52a of the side walls 52. The plurality of engaging projections 54 include, for example, two engaging projections 54A. The engaging projections 54A are, for example, U-shaped. Two engaging projections 54 are, for example, provided between the two engaging projections 54A.

Figure 5:
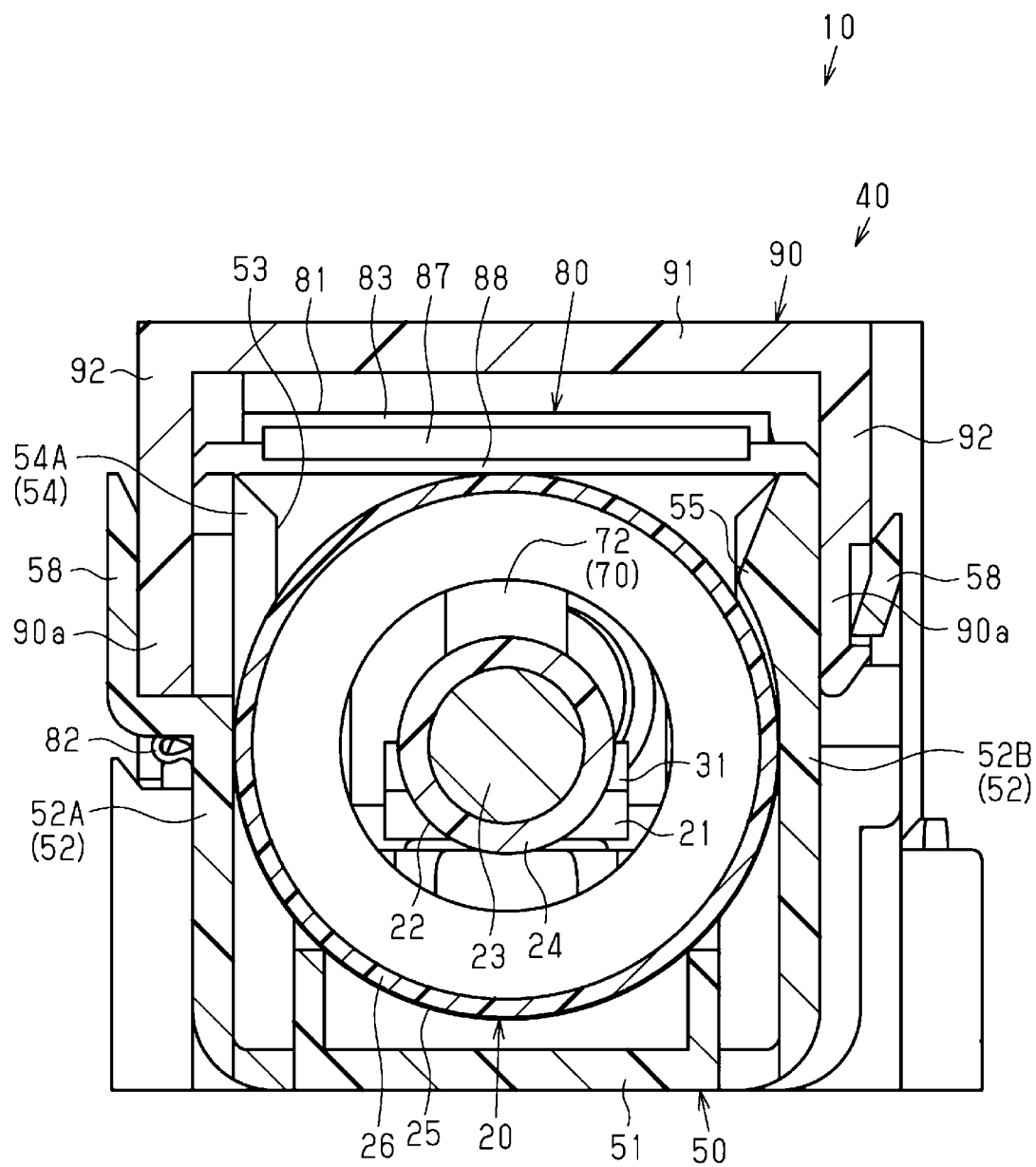
FIG. 5 is a section showing the wiring harness of the one embodiment.

As shown in FIGS. 3 and 5, the part of the side wall 52B constituting the first end 50A is provided with a retaining projection 55 for preventing the corrugated tube 25 from coming out from the opening 53. The retaining projection 55 is provided between the two engaging projections 54A. The retaining projection 55 projects from the side wall 52B toward the side wall 52A. The corrugated tube 25 is prevented from coming out from the opening 53 by the contact of the corrugated tube 25 accommodated inside the protector body 50 with the retaining projection 55.

As shown in FIGS. 3 and 4, a positioning projection 56 to be contacted by an end surface of the corrugated tube 25 is provided between the first and second ends 50A, 50B in the protector body 50. The positioning projection 56 projects from the bottom wall 51 and is coupled to the two side walls 52.

The protector body 50 includes a plurality of first engaging frame portions 57 for fixing the restricting portion 80 to the protector body 50. The protector body 50 includes, for example, three first engaging frame portions 57.

One first engaging frame portion 57 is provided in a part of the side wall 52B facing a first hinge 82 of the restricting portion 80 to be described later. Further, the remaining two first engaging frame portions 57 are provided in parts of the two side walls 52 facing each other across the positioning projection 56.

The protector body 50 includes a plurality of second engaging frame portions 58 for fixing the cover 90 to the protector body 50. The protector body 50 includes, for example, four second engaging frame portions 58.

Two second engaging frame portions 58 are provided in parts of the two side walls 52 constituting the first end 50A. The remaining two second engaging frame portions 58 are provided in parts of the two side walls 52 constituting the second end 50B.

As shown in FIG. 2, a fixing portion 60 projecting from the bottom wall 51 and configured to fix the bolt 70 is provided in a part of the protector body 50 between the positioning projection 56 and the second end 50B. The fixing portion 60 is integrally provided to the bottom wall 51. The fixing portion 60 includes a through hole 61 penetrating through the protector body 50 in a direction orthogonal to the bottom wall 51.

Two engaging pieces 62 extending in an axial direction of the through hole 61 and facing each other are provided inside the through hole 61. Each of the two engaging pieces 62 are cantilevered with one end coupled to the bottom wall 51. The two engaging pieces 62 are provided to be resiliently deformable in directions away from each other.

(Configuration of bolt 70)

The bolt 70 is inserted into the through hole 21a of the first terminal 21 and a through hole 31a of the second terminal 31. The bolt 70 includes a head portion 71 to be accommodated inside the through hole 61 of the fixing portion 60, an externally threaded portion 72 projecting toward the opening 53 from the head portion 71 and a tip 73 extending from the externally threaded portion 72. A projecting direction of the bolt 70 is orthogonal to the bottom wall 51. The bolt 70 projects up to a position more away from the bottom wall 51 than the side walls 52 in the projecting direction.

The head portion 71 is, for example, in the form of a square column A part of the head portion 71 opposite to the bottom wall 51 is engaged with an inner wall of the fixing portion 60 in the projecting direction.

The tip 73 is facing toward a side opposite to the bottom wall 51. The tip 73 is exposed from the protector body 50.

A nut 100 is attached to the externally threaded portion 72. The first and second terminals 21, 31 are fastened by the bolt 70 and the nut 100.

The bolt 70 is inserted into the through hole 61 of the fixing portion 60 in a direction from the bottom wall 51 toward the opening 53. In inserting the bolt 70 into the through hole 61, the two engaging pieces 62 are resiliently deformed in the directions away from each other by the head portion 71 moving while contacting the engaging pieces 62. When the head portion 71 moves to contact the inner wall of the fixing portion 60 in the projecting direction, the two engaging pieces 62 resiliently return to engage the head portion 71. In this way, the bolt 70 is fixed to the fixing portion 60.

(Configuration of Restricting Portion 80)

As shown in FIG. 1, the restricting portion 80 covers a part of the opening 53 of the protector body 50. The restricting portion 80 covers only a part of the first wire member 20 closer to a side opposite to a tip side of the first terminal 21 than the through hole 21a of the first terminal 21 in the length direction and restricts a movement of the first wire member 20 in the projecting direction of the bolt 70. The restricting portion 80 covers the first wire 22 and the corrugated tube 25, out of the first wire member 20. The restricting portion 80 restricts a movement of the corrugated tube 25 with respect to the protector body 50 by contacting the corrugated tube 25.

An insulating material such as a synthetic resin can be, for example, used as a material of the restricting portion 80. The restricting portion 80 is integrally formed to the protector body 50. More particularly, the restricting portion 80 and the protector body 50 are integrally formed by a single resin material.

As shown in FIGS. 3 and 4, the restricting portion 80 includes a restricting portion body 81 for opening and closing the opening 53 and the first hinge 82 coupling the side wall 52A and the restricting portion body 81.

The restricting portion body 81 includes a first part 83 for covering the first wire member 20 from a side opposite to the bottom wall 51, a second part 88 to be overlapped on the outer surface of the first part 83 and a second hinge 87 coupling the first and second parts 83, 88.

The first part 83 includes two arm portions 84 facing each other and a coupling portion 85 coupling end parts of the two arm portions 84. The first part 83 is gate-shaped. One of the two arm portions 84 is coupled to the side wall 52A via the first hinge 82. The other of the two arm portions 84 includes a first engaging claw 81a to be engaged with the first engaging frame portion 57. The first engaging claw 81a is an example of an engaging portion.

The first hinge 82 is provided in a part of the side wall 52A between the first end 50A and the positioning projection 56. The first hinge 82 extends in the length direction. The first hinge 82 is formed to be thinner than the arm portions 84 and the side wall 52A.

An engaging projection 86 to be engaged with the recess 27 of the corrugated tube 25 is provided on the inner surface of the first part 83. The engaging projection 86 is provided over the coupling portion 85 and the two arm portions 84. The engaging projection 86 has, for example, an arcuate shape along the outer peripheral surface of the recess 27.

The second hinge 87 is provided on one end edge of the coupling portion 85 on a side opposite to the first terminal 21 in the length direction. The second hinge 87 extends in a width direction of the protector body 50 orthogonal to the length direction. The second hinge 87 is formed to be thinner than the coupling portion 85 and the second part 88.

As shown in FIG. 1, the second part 88 is shaped to be longer than the first part 83 in the length direction. With the opening 53 closed by the restricting portion 80, the second part 88 extends up to a position closer to the first terminal 21 than the first part 83 in the length direction. That is, the second part 88 covers a part of the first wire member 20 closer to the first terminal 21 than a part covered by the first part 83 in the length direction. More particularly, the second part 88 covers an end part of the corrugated tube 25.

Figure 6:
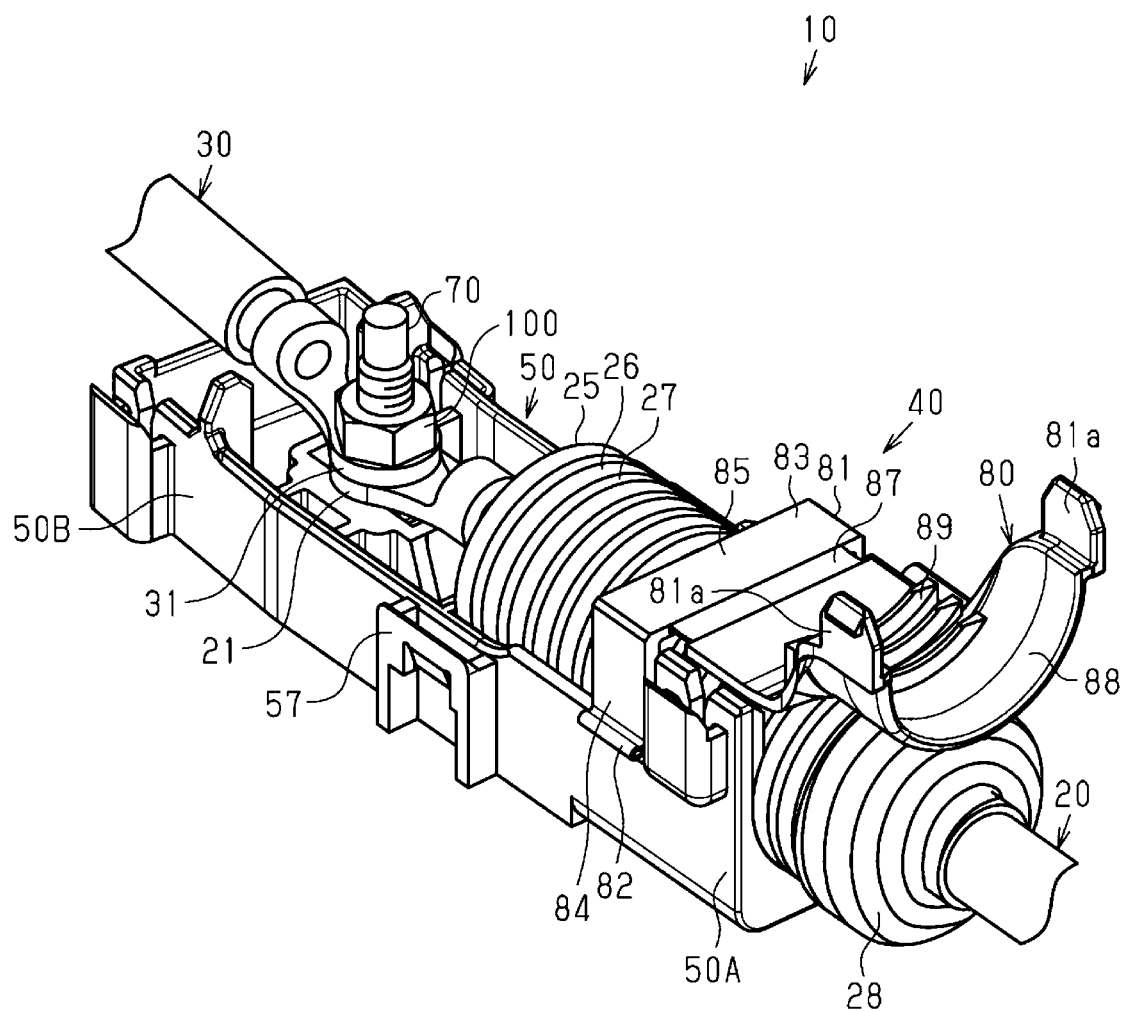
FIG. 6 is a perspective view showing the wiring harness of the one embodiment.

As shown in FIG. 6, an end part of the second part 88 on a side opposite to the second hinge 87 has an arcuate shape along the outer periphery of the corrugated tube 25. This end part is provided with two first engaging claws 81a to be engaged with the first engaging frame portions 57.

A plurality of engaging projections 89 to be engaged with the recesses 27 of the corrugated tube 25 are provided on the inner surface of the second part 88. The plurality of engaging projections 89 are provided at intervals from each other in the length direction. Each of the engaging projections 89 has, for example, an arcuate shape along the outer peripheral surface of the recess 27.

The second part 88 is provided rotatably about the second hinge 87. More particularly, the second part 88 is provided rotatably to an overlapping position where the second part 88 is overlapped on the outer surface of the first part 83 via the second hinge 87 and an unfolded position where the second part 88 is unfolded with respect to the first part 83 and extends toward a side opposite to the first terminal 21 in the length direction.

(Configuration of Cover 90)

As shown in FIG. 1, the cover 90 covers the entire opening 53 of the protector body 50. Accordingly, the cover 90 collectively covers the restricting portion 80, the first terminal 21 and the second terminal 31. An insulating material such as a synthetic resin can be, for example, used as a material of the cover 90.

As shown in FIGS. 1 and 5, the cover 90 has a top wall 91 extending in the length direction and facing the bottom wall 51, and two side walls 92 projecting from both side edges of the top wall 91 and facing each other.

The cover 90 includes four second engaging claws 90a to be engaged with the second engaging frame portions 58. The second engaging claws 90a are provided on the side walls 92.

With the cover 90 mounted on the protector body 50, a clearance is provided between the top wall 91 and the restricting portion 80.

(Assembled Mode of Wiring Harness 10)

As shown in FIGS. 2 and 6, in assembling the wiring harness 10, the first wire member 20 is first accommodated into the protector body 50 through the opening 53. At this time, the first terminal 21 is so arranged that the bolt 70 is inserted into the through hole 21a of the first terminal 21. Further, the plurality of engaging projections 54 are engaged with the recesses 27 while the end surface of the corrugated tube 25 is brought into contact with the positioning projection 56. Since the corrugated tube 25 is positioned with respect to the protector body 50 in the length direction in this way, a pull-out length of the corrugated tube 25 from the protector body 50 is automatically determined.

Subsequently, the restricting portion 80 at the unfolded position is rotated about the first hinge 82 and the first engaging claw 81a of the first part 83 is engaged with the first engaging frame portion 57 of the side wall 52B. At this time, the engaging projection 86 of the first part 83 is engaged with the recess 27 of the corrugated tube 25.

Figure 7:
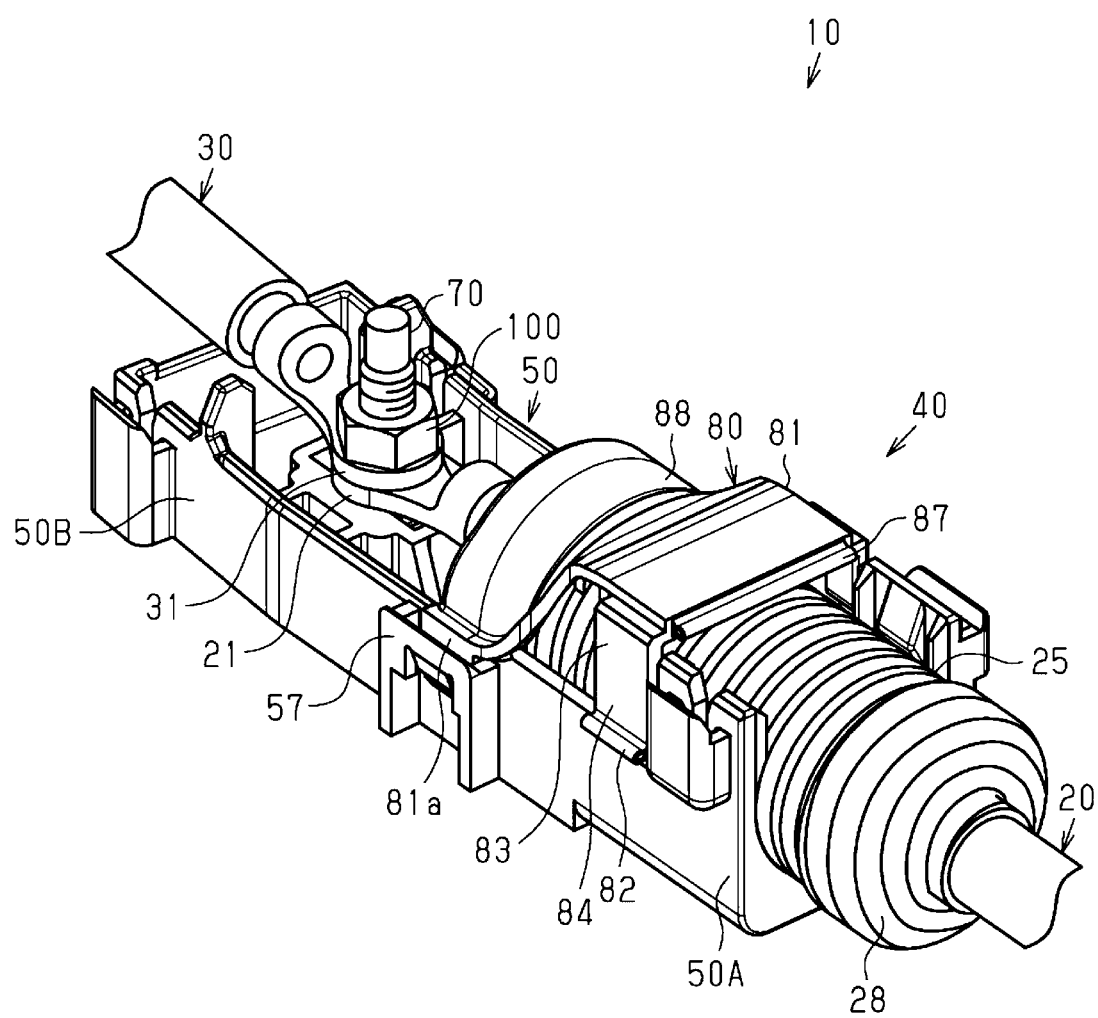
FIG. 7 is a perspective view showing the wiring harness of the one embodiment.

As shown in FIGS. 2 and 7, the second part 88 is subsequently rotated about the second hinge 87 until the restricting portion 80 reaches the overlapping position and the first engaging claws 81a of the second part 88 are engaged with the first engaging frame portions 57 of the two side walls 52. At this time, the engaging projections 89 of the second part 88 are engaged with the recess 27 of the corrugated tube 25.

From the above, the engaging projection 86 of the first part 83 and the engaging projections 89 of the second part 88 are engaged with the recesses 27 of the corrugated tube 25. In this way, a movement of the corrugated tube 25 in the length direction is restricted. Note that since the first wire 22 and the corrugated tube 25 are fixed by the fixing member 28, a movement of the entire first wire member 20 is restricted by the restricting portion 80.

Subsequently, the second wire member 30 is accommodated into the protector body 50. At this time, the second terminal 31 is so arranged that the bolt 70 is inserted into the through hole 31a. In this way, the first and second terminals 21, 31 are overlapped in the projecting direction of the bolt 70.

Subsequently, the nut 100 is attached to the externally threaded portion 72 of the bolt 70, thereby fastening the first and second terminals 21, 31. In this way, the first and second terminals 21, 31 are electrically connected. Note that since the bolt 70 is not covered by the restricting portion 80, the nut 100 can be easily attached to the bolt 70.

Finally, the cover 90 is mounted on the protector body 50 by engaging the second engaging claws 90a of the cover 90 with the second engaging frame portions 58 of the protector body 50.

In this way, the wiring harness 10 is assembled.

Functions and effects of this embodiment are described.

(1) The wiring harness 10 is provided with the first wire member 20 including the first terminal 21 and the first wire 22 and the protector 40 for accommodating the first wire member 20. The protector 40 includes the protector body 50, the bolt 70 and the restricting portion 80. The protector body 50 has the bottom wall 51 extending in the length direction, the two side walls 52 projecting from both side edges of the bottom wall 51 and facing each other, and the opening 53 formed by the two side walls 52 and facing the bottom wall 51. The bolt 70 has the tip 73 facing toward the side opposite to the bottom wall 51, projects from the protector body 50 and is inserted into the through hole 21a of the first terminal 21. The restricting portion 80 covers only the part of the first wire member 20 closer to the side opposite to the tip side of the first terminal 21 than the through hole 21a in the length direction and restricts a movement of the first wire member 20 in the projecting direction of the bolt 70.

According to this configuration, a movement of the first wire member 20 in the projecting direction is restricted inside the protector 40. Therefore, the escape of the bolt 70 from the first terminal 21 can be suppressed.

Figure 8:
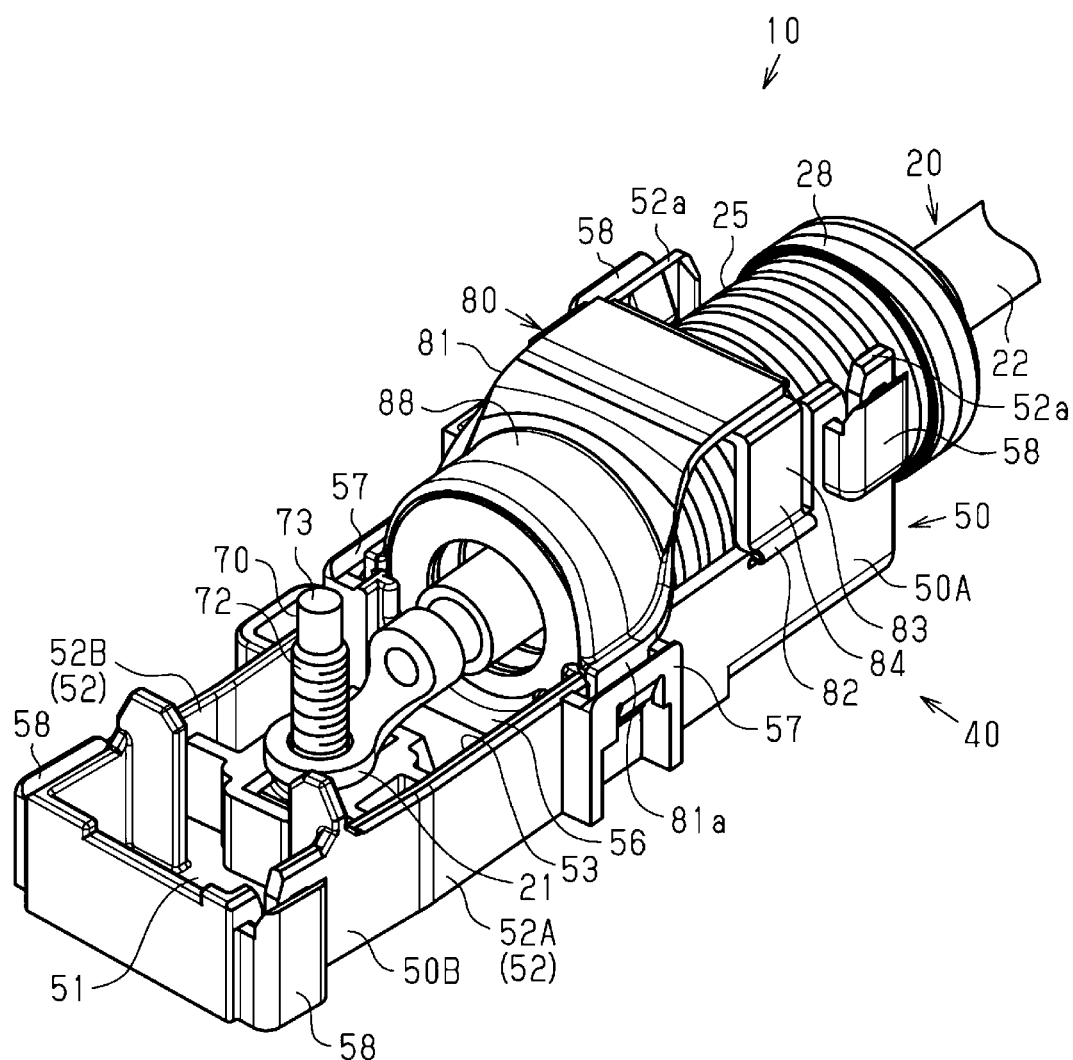
FIG. 8 is a perspective view showing the wiring harness of the one embodiment in a temporarily assembled state.

Further, according to the above configuration, the escape of the bolt 70 from the first terminal 21 can be suppressed in the temporarily assembled state where the bolt 70 is inserted only in the through hole 21a of the first terminal 21 as shown in FIG. 8. Thus, the wiring harness 10 in the temporarily assembled state can be easily transported.

(2) The restricting portion 80 restricts a movement of the first wire member 20 in the length direction by contacting the first wire member 20.

According to this configuration, since the movement of the first wire member 20 in the length direction is restricted, it is possible to suppress the application of a load to the first terminal 21 according to this movement of the first wire member 20.

(3) The restricting portion 80 includes the restricting portion body 81 for opening and closing the opening 53 of the protector body 50 and the first hinge 82 coupling the side wall 52A and the restricting portion body 81.

According to this configuration, the opening 53 of the protector body 50 can be opened and closed by rotating the restricting portion body 81 via the first hinge 82. Therefore, the restricting portion 80 can be embodied by a simple configuration.

(4) The restricting portion body 81 includes the first engaging claw 81a to be engaged with the side wall 52B.

According to this configuration, a state where the opening 53 of the protector body 50 is closed by the restricting portion body 81 is easily maintained by engaging the restricting portion body 81 with the side wall 52B. Therefore, a movement of the first wire member 20 in the projecting direction of the bolt 70 can be effectively restricted.

(5) The restricting portion body 81 includes the first part 83 for covering the first wire member 20 from the side opposite to the bottom wall 51, the second part 88 to be overlapped on the outer surface of the first part 83 and configured to cover the part of the first wire member 20 closer to the first terminal 21 than the part covered by the first part 83 in the length direction, and the second hinge 87 coupling the first part 83 and the second part 88. The second part 88 is provided rotatably to the position where the second part 88 is overlapped on the outer surface of the first part 83 via the second hinge 87 and the position where the second part 88 is unfolded with respect to the first part 83 and extends toward the side opposite to the first terminal 21 in the length direction.

For example, if a part projecting from the protector body 50 or the like is present on the outer peripheral side of the side wall 52A, the restricting portion body 81 may interfere with this part by being rotated toward the outer peripheral side of the side wall 52A.

In this respect, according to the above configuration, the second part 88 longer than the first part 83 in the length direction is coupled to the first part 83 via the second hinge 87 and overlapped on the outer surface of the first part 83. The second part 88 is provided rotatably to the position where the second part 88 is overlapped on the outer surface of the first part 83 via the second hinge 87 and the position where the second part 88 is unfolded with respect to the first part 83. Thus, in rotating the restricting portion body 81 toward the outer peripheral side of the side wall 52A, the restricting portion body 81 can be rotated toward the outer peripheral side of the side wall 52A with the second part 88 unfolded with respect to the first part 83. At this time, the second part 88 extends toward the side opposite to the first terminal 21 in the length direction. That is, the second part 88 extends in a direction away from the above projecting part. Therefore, the aforementioned inconvenience is easily avoided.

(6) The restricting portion 80 and the protector body 50 are integrally formed.

According to this configuration, an increase in the number of components of the protector 40 and, consequently, the number of components of the wiring harness 10 can be suppressed.

(7) The first wire member 20 includes the corrugated tube 25 for covering the outer periphery of the first wire 22. The restricting portion 80 restricts a movement of the corrugated tube 25 with respect to the protector body 50 by contacting the corrugated tube 25.

According to this configuration, the movement of the first wire member 20 with respect to the protector body 50 is restricted via the corrugated tube 25. Therefore, the escape of the first terminal 21 from the bolt 70 can be suppressed.

(8) The corrugated tube 25 has the bellows structure in which the annular projections 26 and the annular recesses 27 having a smaller outer diameter than the projections 26 are alternately provided in the length direction. The restricting portion 80 includes the engaging projections 86, 89 to be engaged with the recesses 27.

According to this configuration, a movement of the corrugated tube 25 with respect to the protector body 50 can be effectively restricted by the engagement of the engaging projections 86, 89 of the restricting portion 80 with the recesses 27 of the corrugated tube 25.

(9) The protector 40 includes the cover 90 removably provided on the protector body 50 and configured to collectively cover the restricting portion 80 and the first terminal 21.

According to this configuration, since the restricting portion 80 and the first terminal 21 are collectively covered by the cover 90, a connected part of the first terminal 21 and the second terminal 31 can be protected and the removal of the restricting portion 80 from the protector body 50 can be suppressed.

(10) The wiring harness 10 is provided with the second wire member 30 including the second terminal 31 and the second wire 32 and to be electrically connected to the first wire member 20. The bolt 70 is inserted into the through hole 21a of the first terminal 21 and the through hole 31a of the second terminal 31. The nut 100 for fastening the first and second terminals 21, 31 is attached to the bolt 70.

According to this configuration, the escape of the first terminal 21 from the bolt 70 can be suppressed in the temporarily assembled state where the bolt 70 is inserted in the through hole 21a of the first terminal 21 and the first and second terminals 21, 31 are not fastened by the bolt 70 and the nut 100.

(11) The protector 40 includes the protector body 50, the bolt 70 and the restricting portion 80. The protector body 50 includes the bottom wall 51 extending in the length direction, the two side walls 52 projecting from both side edges of the bottom wall 51 and facing each other, and the opening 53 formed by the two side walls 52 and facing the bottom wall 51. The bolt 70 includes the tip 73 facing toward the side opposite to the bottom wall 51, projects from the protector body 50 and is inserted into the through hole 21a of the first terminal 21. The restricting portion 80 covers only the part of the first wire member 20 closer to the side opposite to the tip side of the first terminal 21 than the through hole 21a in the length direction and restricts a movement of the first wire member 20 in the projecting direction of the bolt 70.

According to this configuration, a movement of the first wire member 20 in the projecting direction is restricted inside the protector 40. Therefore, the escape of the first terminal 21 from the bolt 70 can be suppressed.

<Modification>

This embodiment can be modified and carried out as follows. This embodiment and the following modifications can be carried in combination without technically contradicting each other.

Figure 9:
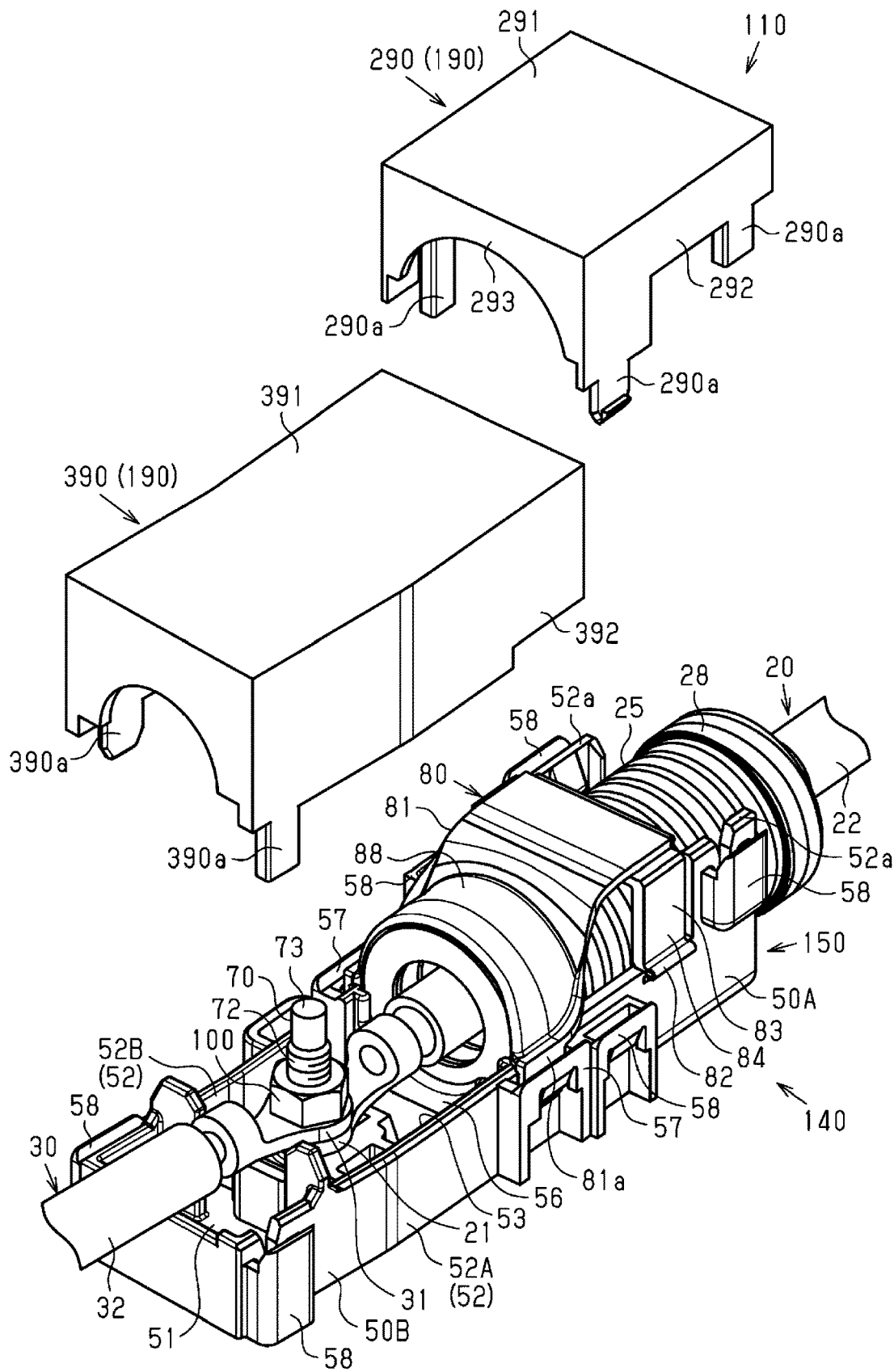
FIG. 9 is an exploded perspective view showing a wiring harness of a modification.
Figure 10:
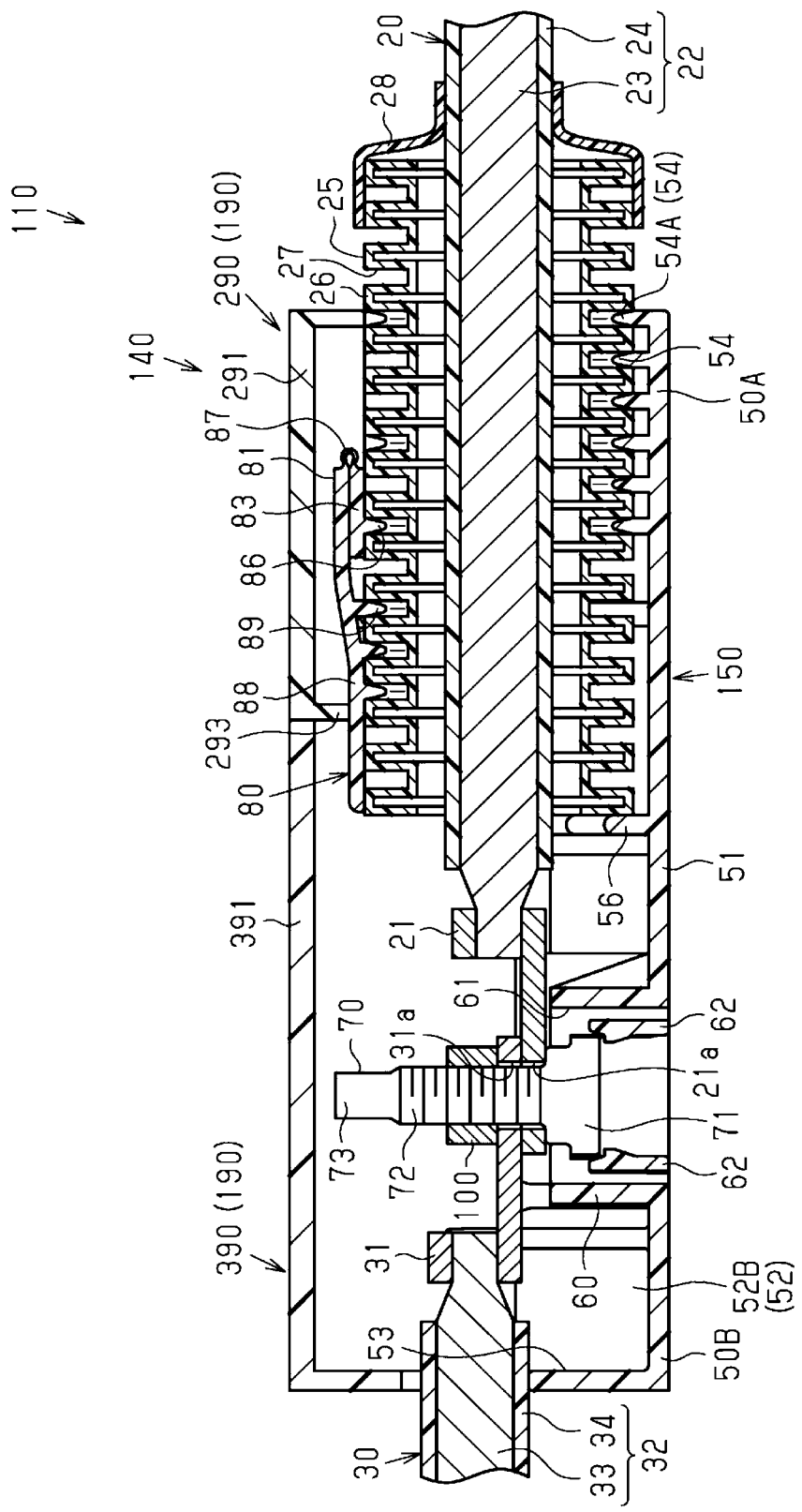
FIG. 10 is a section showing the wiring harness of the modification.

- The second wire member 30 can be omitted from the wiring harness 10.
- The cover 90 can be omitted from the protector 40.
- The restricting portion 80 may include a projection for pressing the first wire member 20 toward the bottom wall 51 instead of the engaging projections 86, 89. In this case, a movement of the first wire member 20 in the length direction is restricted by a friction force acting on the first wire member 20 due to a pressing force of the projection.
- At least either the engaging projection 86 or the engaging projections 89 can be omitted from the restricting portion 80. If the engaging projections 89 are omitted from the restricting portion 80, the second part 88 may be configured to press the corrugated tube 25 toward the bottom wall 51.
- The corrugated tube 25 can be omitted from the first wire member 20. In this case, the restricting portion 80 directly contacts the first wire 22.
- The restricting portion 80 may be provided separately from the protector body 50. The restricting portion 80 includes, for example, a first hinge separate from the side wall 52A and the restricting portion body 81.
- The second part 88 can be omitted from the restricting portion body 81. That is, the restricting portion body 81 may be composed only of the first part 83.
- The second hinge 87 can be omitted from the restricting portion 80. In this case, the restricting portion body 81 may be integrally provided with the first and second parts 83, 88.
- The first hinge 82 can be omitted from the restricting portion 80. In this case, the restricting portion body 81 may be removably mounted on the protector body 50.
- The restricting portion 80 may be a clamp member mounted on the protector body 50 and configured to sandwich the first wire member 20, a band member to be wound on the outer periphery of the protector body 50 and configured to cover the first wire member 20 from the side opposite to the bottom wall 51, or the like.
- The restricting portion 80 may not contact the first wire member 20. Even in this case, the first wire member 20 contacts the restricting portion 80 when being moved in the projecting direction of the bolt 70, wherefore a movement of the first wire member 20 in the projecting direction is restricted.
- The restricting portion 80 may cover a part of the first terminal 21 closer to the side opposite to the tip side of the first terminal 21 than the through hole 21a in the length direction. The restricting portion 80 may cover, for example, the connected part of the first terminal 21 and the core 23.
- The bolt 70 may project obliquely with respect to the bottom wall 51.
- The bolt 70 may be insert-molded with the protector body 50.
- As shown in FIGS. 9 and 10, a protector 140 may include a cover 190 instead of the cover 90. The cover 190 includes a first cover 290 and a second cover 390 divided in the length direction and adjacent to each other. The first cover 290 covers a part of the restricting portion 80. The second cover 390 collectively covers a part of the restricting portion 80 adjacent to the above part, the first terminal 21 and the second terminal 31. The first and second covers 290, 390 are divided in the length direction in an arcuate part of the second part 88. The first cover 290 includes, for example, four second engaging claws 290a with two second engaging claws 290a provided on each side wall 292. The second cover 390 includes, for example, two second engaging claws 390a with one second engaging claw 290a provided on each side wall 392. A protector body 150 includes, for example, six second engaging frame portions 58 to be respectively engaged with the four second engaging claws 290a and the two second engaging claws 390a. A facing wall 293 extending toward the second part 88 is provided on an end part of the first cover 290 facing the second cover 390 in the length direction. The facing wall 293 has an arcuate shape along the outer periphery of the second part 88. The facing wall 293 is in contact with the second part 88. Note that, in this modification, the same components as those of the above embodiment are denoted by the same reference signs and corresponding components are denoted by reference signs obtained by adding "100", "200" or "300" to the reference signs denoting the same components of the above embodiment, whereby repeated description is omitted.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A wiring harness, comprising:
a wire member including a terminal having a through hole on a tip side and a wire connected to the terminal; and
a protector configured to accommodate the wire member,
wherein the protector includes:
a protector body having a bottom wall extending in a length direction of the wire member, two side walls projecting from both side edges of the bottom wall and facing each other and an opening formed by the two side walls and facing the bottom wall;
a bolt having a tip facing a side opposite to the bottom wall, projecting from the bottom wall and to be inserted into the through hole of the terminal; and
a restricting portion configured to cover only a part of the wire member closer to a side opposite to the tip side of the terminal including the through hole in the length direction, the restricting portion restricting a movement of the wire member in a projecting direction of the bolt by contacting the wire member.

2. The wiring harness of claim 1, wherein the restricting portion restricts a movement of the wire member in the length direction.

3. The wiring harness of claim 1, wherein the restricting portion includes:

a restricting portion body for opening and closing the opening; and a hinge coupling one of the two side walls and the restricting portion body.

4. The wiring harness of claim 3, wherein the restricting portion body includes an engaging portion to be engaged with the other of the two side walls.

5. The wiring harness of claim 3, wherein when the hinge is a first hinge, the restricting portion body includes:
- a first part coupled to the first hinge, the first part covering the wire member from a side opposite to the bottom wall;
- a second part to be overlapped on an outer surface of the first part, the second part covering a part of the wire member closer to the terminal than a part covered by the first part in the length direction; and
- a second hinge provided on one end edge of the first part on a side opposite to the terminal in the length direction, the second hinge coupling the first and second parts, and the second part is provided rotatably to a position where the second part is overlapped on the outer surface of the first part via the second hinge and a position where the second part is unfolded with respect to the first part and extends toward the side opposite to the terminal in the length direction.

6. The wiring harness of claim 1, wherein the restricting portion and the protector body are integrally formed.

7. The wiring harness of claim 1, wherein:

the wire member includes a corrugated tube for covering an outer periphery of the wire, and the restricting portion restricts a movement of the corrugated tube with respect to the protector body by contacting the corrugated tube.

8. The wiring harness of claim 7, wherein:

the corrugated tube has a bellow structure in which annular projections and annular recesses having a smaller outer diameter than the projections are alternately provided in the length direction, and the restricting portion includes engaging projections to be engaged with the recesses.

9. The wiring harness of claim 1, wherein the protector includes a cover removably provided on the protector body, the cover collectively covering the restricting portion and the terminal.

10. The wiring harness of claim 1, wherein when the terminal is a first terminal, the wire is a first wire and the wire member is a first wire member, the wiring harness comprises a second wire member including a second terminal having a through hole and a second wire connected to the second terminal, the second wire member being electrically connected to the first wire member, the bolt is inserted into the through hole of the first terminal and the through hole of the second terminal, and a nut for fastening the first and second terminals is attached to the bolt.

11. A protector for accommodating a wire member, the protector comprising:

a protector body having a bottom wall extending in a length direction of the wire member including a terminal having a through hole on a tip side and a wire connected to the terminal, two side walls projecting from both side edges of the bottom wall and facing each other and an opening formed by the two side walls and facing the bottom wall;

a bolt having a tip facing a side opposite to the bottom wall, projecting from the bottom wall and to be inserted into the through hole of the terminal; and a restricting portion configured to cover only a part of the wire member closer to a side opposite to the tip side of the terminal including the through hole in the length direction, the restricting portion restricting a movement of the wire member in a projecting direction of the bolt by contacting the wire member.

\* \* \* \* \*